NON-RECIPROCAL WAVE TRANSLATING NETWORK

Filed Nov. 30, 1966

INVENTOR.
WILLIAM NEW
ROBERT W. NEWCOMB
BY Samuel Lindenberg
Arthur Frailich
ATTORNEYS 3,478,226

NON-RECIPROCAL WAVE TRANSLATING NETWORK

William New, Durham, N.C., and Robert W. Newcomb, Palo Alto, Calif., assignors to The Board of Trustees of the Leland Stanford Junior University, a body corporate Filed Nov. 30, 1966, Ser. No. 597,993
Int. Cl. G06g 7/12
U.S. Cl. 307—229 7 Claims

ABSTRACT OF THE DISCLOSURE

A gyrator circuit is provided comprised of three transistors which are arranged so that a first and third of these operate as voltage to current converters and a second is a voltage inverter. An input signal is applied to the voltage inverter. The output of the voltage inverter is applied to a voltage to current converter. A load is connected to the output of this voltage to current converter and its output is also fed back to the other voltage to current converter whose output in turn is connected to the input of the voltage inverter.

This invention comprises a non-reciprocal signal translating network known as a gyrator circuit whose design is such that it can be constructed as an integrated circuit and it has the further property that it is time variable.

The gyrator may be defined as a four-terminal element or network in which the following relationships exist:

$$E_1 = -R_B I_2$$

$$E_2 = R_A I_1$$

Since the coefficients of the current terms are of opposite signs and in general are unequal the gyrator violates the principle of reciprocity. This is in marked contrast to networks composed of the usual electrical elements, such as resistors, capacitors, inductors and transformers, in that such element individually, and in combination, satisfy the reciprocity theorem. In simple terms, the reciprocity theorem states that a voltage source is inserted at one point in a network and if the current produced thereby in some other part of the network is measured, the ratio of measured current to the applied voltage called the transfer impedance will be the same if the relative positions of the driving source and the measured effect are reversed. In the gyrator, however, the transfer impedance for propagation in one direction of application differs in sign from that for propagation in the reverse direction. In addition, the magnitudes of the transfer impedances for the two directions of propagation are in general unequal.

Besides the important use of the gyrator as an impedance inverter whereby, for example, if impedance Z is connected between one pair of terminals of the gyrator the impedance measured at the other terminals is proportional to 1/Z, other important uses of the gyrator may be its utility as a time variable transformer. It also appears that any integrated circuit realization of a gyrator would be of considerable interest because an inductor can be obtained through capacitor loading of a gyrator circuit. Some types of gyrator circuits are described and claimed in Patents Nos. 3,098,978, 3,109,147 and 3,120,645.

An object of this invention is the provision of a new, novel and simple arrangement for a gyrator circuit.

Still another object of this invention is the provision of a gyrator circuit which is time variable.

Another object of this invention is the provision of a gyrator circuit which may be constructed in integrated form.

These and other objects of the present invention are achieved in a circuit arrangement wherein an input signal is applied to a voltage-to-current converter stage and also to a voltage inverter stage of the gyrator. The output current of the voltage-to-current converter stage supplies the current for the input signal. The output of the voltage inverter stage is applied to a second voltage-to-current converter stage. The output of this stage is thereafter applied both to the output load impedance and to the input of the first voltage-to-current converter stage.

More specifically, the gyrator circuit, in accordance with this invention, has a minimum of three transistors. The input signal is applied to the output of the first transistor and the input of the second transistor which act as the first voltage-to-current converter stage and as the voltage inverter stage, respectively. The output of the voltage inverter stage is applied to the third transistor which acts as the second voltage-to-current converter stage. The output of the third transistor is applied both to the output load and to the input of the first transistor.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
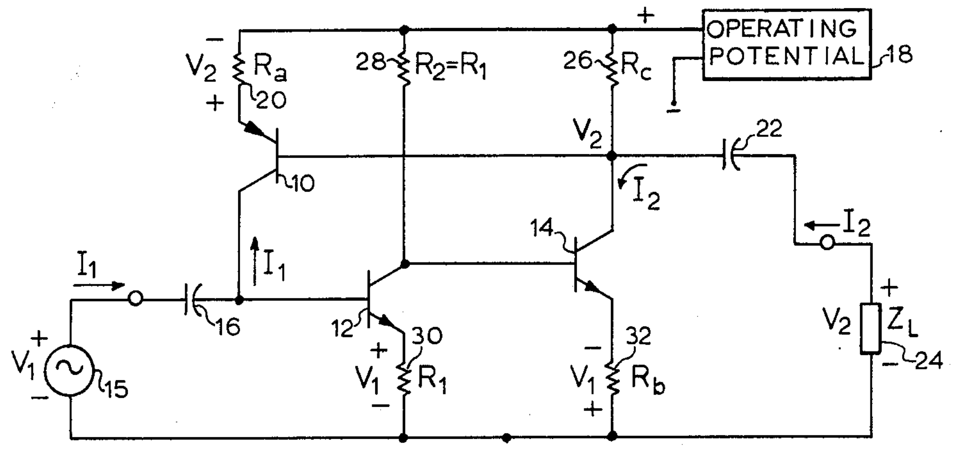
FIGURE 1 is a schematic circuit diagram of an embodiment of this invention.

Referring now to FIGURE 1 of the drawings there may be seen a circuit diagram of an embodiment of the invention. This includes first, second and third transistors respectively 10, 12 and 14. Each having emitter, base and collector electrodes. It will be noted that all of these transistors are of the NPN type. Also additional circuitry (not affecting signal flow) for purposes of biasing each of the transistors into the region of linear operation has been deleted for clarity. These facts should not be construed as a limitation upon the invention since those skilled in the art will readily know how to use PNP transistors in place of the NPN transistors and how to effect proper biasing by making appropriate circuit and power supply changes.

A source of input signals 15 to the gyrator circuit provides an input voltage $V_1$ and an input current $I_1$. This signal source is coupled, by means of a capacitor 16, to the collector of transistor 10 and to the base of transistor 12. The emitter of transistor 10 is connected to a source of operating potential 18, through a resistor 20. The base of transistor 10 is connected to the collector of transistor 14 and also through a capacitor 22 to an output load 24. The collector of transistor 14 is connected through a resistor 26 to the source of operating potential 18. The collector of transistor 12 is connected through a resistor 28 to the source of operating potential 18.

The base of transistor 14 is connected to the collector of transistor 12. The emitter of transistor 12 is connected to ground through a resistor 30. The emitter of transistor 14 is connected to ground through a resistor 32. The output impedance 24 is also connected to ground.

Resistor 20 in the formulas that follow will be designated as $R_a$, resistor 28 will be designated as $R_2$, resistor 30 will be designated as $R_1$, resistor 32 will be designated at $R_b$, and the output impedance 24 will be designated as $Z_L$. Resistor 26 will be designated as $R_c$. Transistors 10, 12 and 14 will be respectively designated at $T_1$, $T_2$ and $T_3$.

The circuit shown in FIGURE 1 may be analyzed as follows. Considering only signal components, the coupling of a load 24 ($Z_L$) to the collector of transistor $T_3$ and the base of transistor $T_1$ allows a voltage $V_2$ to appear directly across resistor $R_a$. This causes a current to flow through resistor $R_a$ into the emitter of transistor $T_1$. Observing the directional flow indicated for current $I_1$ into the collector of $T_1$, observing the polarity indicated for voltage $V_2$ appearing across the load impedance and at the emitter of $T_1$ and noting that to a good approximation the collector current of $T_1$ is equal in magnitude to the emitter current of $T_1$, then:

$$I_1=(1/R_a)V_2 \qquad (1)$$

Thus, transistor $T_1$ acts as a voltage-to-current converter. Transistor $T_2$ acts as a voltage inverter, where $R_2=R_1$ is chosen to apply the voltage $-V_1$ on the base, and hence the emitter, of $T_3$. This emitter voltage $-V_1$ on transistor $T_3$ appears across resistor $R_b$ and causes an emitter current to flow therein. If $R_c$ is chosen to satisfy the condition:

$$R_c \gg |Z_L| \qquad (2)$$

then $I_2$ is to a good approximation the collector current of transistor $T_3$. Since to a good approximation the emitter current of $T_3$ is equal to the collector current of $T_3$, the current flow through $R_b$ is equal to $I_2$. The transistor $T_3$ thus also acts as a voltage-to-current converter where, observing polarities, $$I_2=(1/R_b)-V_1 \qquad (3)$$

when $R_1=R_2$.

Equations 1 and 3 describe a gyrator, and for load impedances satisfying (2) the described circuit between the source and load behaves as a gyrator.

To make the circuit time variable, one can simply vary $R_a$ and $R_b$. Many ways of accomplishing this are available, but probably the most satisfying is to use the source-to-drain resistance of a field effect transistor (FET)

operated below pinch-off. This yields a linear resistance over a reasonable range which can be easily varied by varying the gate voltage.

Figure 2:
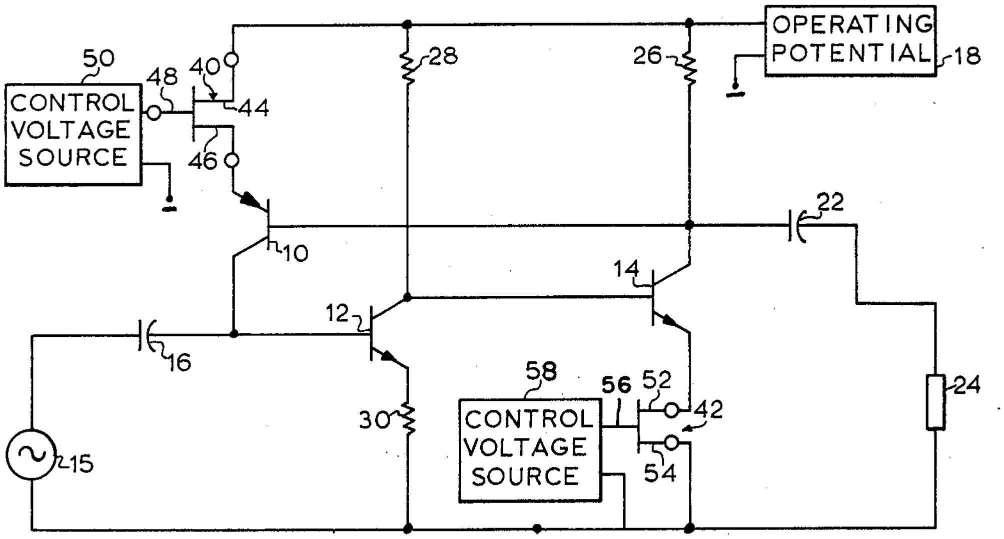
FIGURE 2 shows how the embodiment of the invention may be made time variable.

FIGURE 2 is a circuit diagram illustrating how two field effect transistors may be inserted in the gyrator circuit of FIGURE 1 to provide a time variable gyrator. All the structures of FIGURE 2 are found in FIGURE 1 except for the resistors 20 and 32, which are replaced by FETs, 40 and 42 respectively. The drain electrode 44 of FET 40 is connected to the operating potential source and the source electrode 46 is connected to emitter of transistor 10. The gate electrode 48 is connected to a control voltage source 50. The drain electrode 52 of FET 42 is connected to the emitter of transistor 14. The source electrode 54 is connected to ground and the gate electrode 56 is connected to a variable control voltage source 58.

By varying the variable control voltages 50 and 58 the values of $R_a$ and $R_b$ are varied respectively and the circuit is made time variable. Thus, by cascading two of the circuits shown in FIGURE 2 one can make a time variable transformer. By cascading two of the gyrator circuits and providing the second with a capacitive load and by varying the resistors $R_a$ and $R_b$, one may obtain a wide range of capacitance values. Cascading of more transforming sections allows almost arbitrarily large capacitors to be obtained and these can be easily varied by variation of the resistances.

There has therefore been described herein a novel, useful and unique gyrator circuit which is both time variable and capable of being fabricated as an integrated circuit.

What is claimed is:

1. A gyrator circuit comprising:
- a first, second and third transistor each having base, emitter and collector;
- means coupling the collector of said first transistor to the base of said second transistor;
- means coupling the collector of said second transistor to the base of said third transistor;
- means coupling the collector of said third transistor to the base of said first transistor;
- first and second operating potential terminals;
- a first resistance means connected between said first transistor emitter and said first operating potential terminal;
- a second resistance means connected between said second transistor collector and said first operating potential terminal;
- a third resistance means connected between said third transistor collector and said first operating potential terminal;
- a fourth resistance means connected between said second transistor emitter and said second operating potential terminal;
- a fifth resistance means connected between said third transistor emitter and said second operating potential terminal;
- means for applying input signals between said second operating potential terminal and said second transistor base; and
- means for coupling a load impedance between said third transistor collector and said second operating potential terminal.

2. A gyrator circuit as recited in claim 1 wherein: said second and fourth resistance means have equal resistance values.

3. A gyrator circuit as recited in claim 1 wherein: said first and fifth resistance means are variable.

4. A gyrator circuit as recited in claim 3 wherein said first and fifth resistance means each comprises a field effect transistor.

5. A gyrator circuit as recited in claim 4 wherein each field effect transistor includes a gate, drain and source electrode, and there is included means for applying a controllable potential to the gate electrode of each transistor to control the resistance value thereof;
- means connecting the source electrode of one of said field effect transistors to the first transistor emitter;
- means connecting the drain electrode of said one field effect transistor to the first operating potential terminal;
- means connecting the source electrode of the other of said field effect transistors to the second operating potential terminal; and
- means connecting the drain electrode of the other of said field effect transistors to the third transistor emitter.

6. A gyrator circuit comprising:
- a first and second voltage to current converter stage respectively comprising a first and second transistor each having an emitter, collector and base electrode;
- a voltage inverter stage comprising a third transistor having collector, emitter and base electrodes;
- means coupling the collector of said third transistor to the base of said second transistor;
- means for connecting a load impedance to the collector of said second transistor;
- means coupling the collector of said second transistor to the base of said first transistor;
- means for applying a bias to the emitter electrodes of said first, second and third transistors; and means for applying signals to said first transistor collector and to said third transistor base.

7. A gyrator circuit as recited in claim 6 wherein: said first and second voltage to current converter stages each include a variable resistance means.

References Cited

UNITED STATES PATENTS

| | | | |
|---|---|---|---|
| 3,001,157 | 9/1961 | Sipress et al. | 333—80 |
| 3,098,978 | 7/1963 | Sipress | 330—12 |
| 3,120,645 | 2/1964 | Sipress et al. | 330—12 |
| 3,255,364 | 6/1966 | Warner | 333—80 XR |

DONALD D. FORRER, Primary Examiner

J. ZAZWORSKY, Assistant Examiner

U.S. Cl. X.R.

307—304; 333—80